April 19, 1960     J. A. GOUGH     2,932,908
TRAINING AID

Filed July 28, 1959     2 Sheets-Sheet 1

INVENTOR
JOHN A. GOUGH

BY *Scrivener & Parker*

ATTORNEYS

April 19, 1960

J. A. GOUGH 2,932,908

TRAINING AID

Filed July 28, 1959

INVENTOR
JOHN A. GOUGH

Scrivener + Parker
ATTORNEYS

United States Patent Office 2,932,908
Patented Apr. 19, 1960

2,932,908
TRAINING AID
John A. Gough, Prince Georges County, Md.
Application July 28, 1959, Serial No. 830,116
5 Claims. (Cl. 35—48)

This invention relates to educational devices and more particularly to an improved training aid useful for young children in helping them learn arithmetic, spelling, word associations etc.

A broad object of the present invention is to provide a training aid device which is entertaining and encourages self-instruction by young children in arithmetic, spelling, word associations etc.

More particularly, it is an object of the present invention to provide a training aid which encourages a child to match up numbers with their sums, differences or products, or to match up a picture of an animal or object with its printed name and thereafter enables the child to check the correctness of his efforts.

Other objects and their attendant advantages will become apparent as the following detailed description is read in conjunction with the accompanying drawings wherein.

Figure 1:
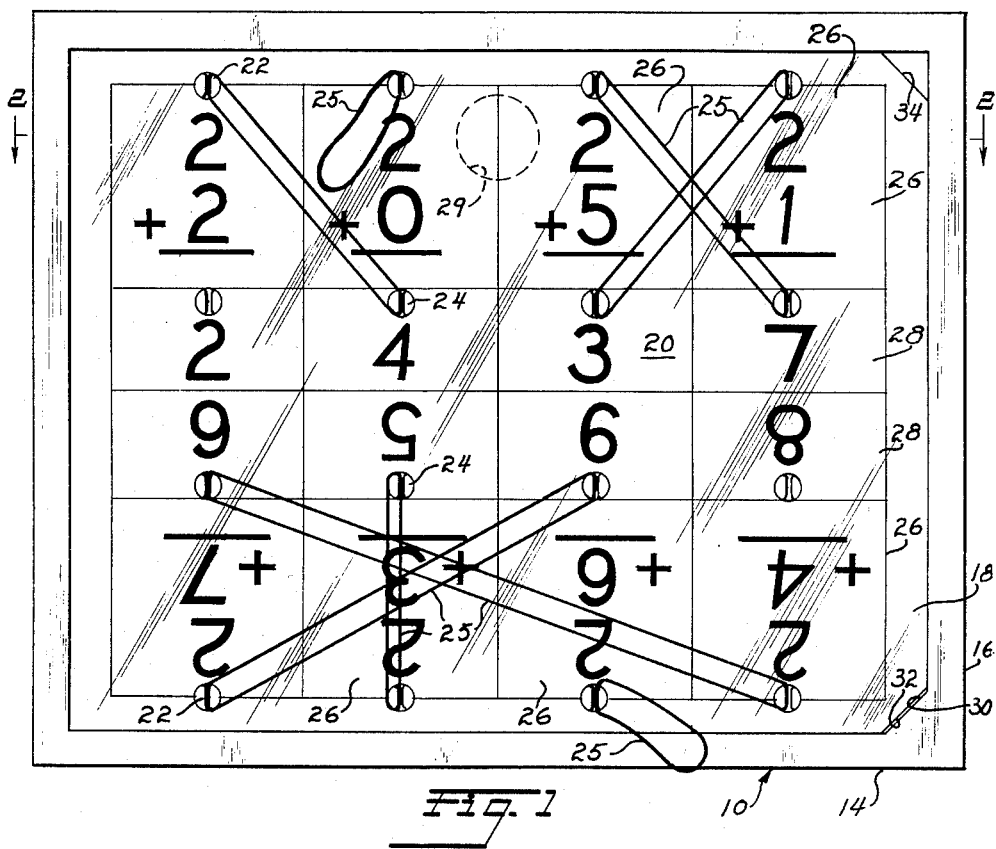
Fig. 1 is a vertical elevation of the training aid of the present invention.
Figure 2:
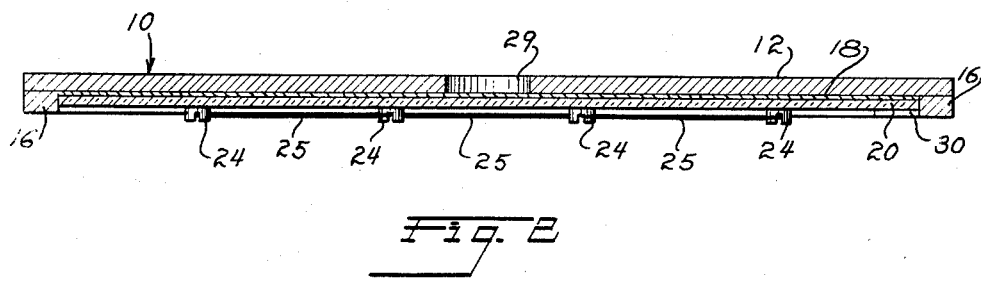
Fig. 2 is a horizontal cross-sectional view taken substantially on the line 2—2 of Fig. 1.

Referring now to the drawings, and particularly to Figs. 1 and 2, the training aid of the present invention consists of a rectangular frame 10 composed of a bottom plate 12 having marginal side and end members 14, 16 thereon which form with the plate 12 a recessed structure adapted to receive a card 18 and a transparent overlay 20.

Figure 3:
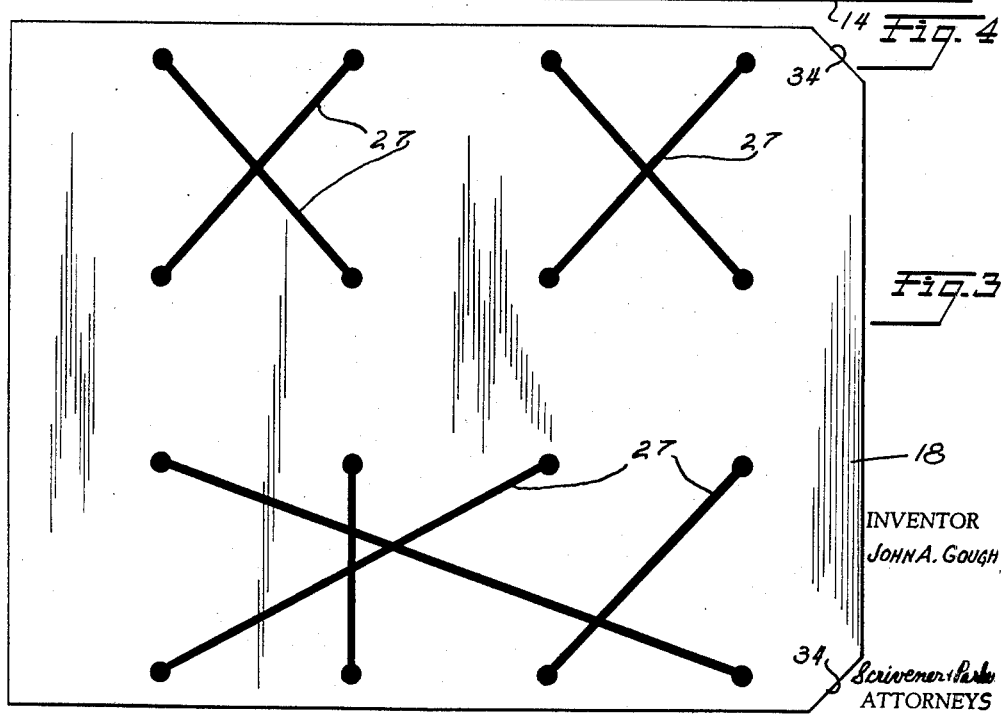
Fig. 3 is a vertical elevational view of the rear or answer side of a card employed with the present invention.

In the embodiment of the invention illustrated in Fig. 1, the overlay 20, which is preferably a sheet of Plexiglass or similar substance, is provided with a plurality of rows of spaced vertical bosses with the bosses 22 of the upper and lowermost rows being notched as indicated to frictionally receive rubber bands 25. The inner rows of bosses 24, which may or may not be notched, are adapted to have slid thereover the opposite end of the rubber bands. The cards 18, of which a typical one is illustrated, are adapted to fit within the opening of the frame 10 and each card has printed on one side thereof indicia which may comprise a plurality of arithmetical problems and their answers. The problems are desirably arranged in blocks 26 so positioned on the card that they underlay or are adjacent the bosses 22 in the outer rows of bosses on the overlay. The answers to the problems are arranged in blocks 28 immediately inwardly of the problem blocks 26 and so positioned on the card that they underlay the inner rows of bosses 24. As will be apparent from an inspection of Fig. 1, the answers in the blocks 28 are randomly arranged with respect to the problems in the blocks 26 and the task of the trainee is to stretch the rubber band from a notched boss over a problem block to the boss overlaying the correct solution in one of the answer blocks. For example, in the upper left hand block of Fig. 1, the problem is to find the sum of 2+2. The answer being 4, the trainee merely stretches the rubber band from the boss over the "2+2" block to the boss over the "4" block. The trainee does this for each problem on the card and when he has completed this he removes the overlay with its stretched rubber bands from the frame and then removes the card which he reverses and places back into the frame. On the rear of the card as illustrated in Fig. 3, are printed a plurality of straight lines 27 which correspond to the respective problems and answers on the front of the card. When the overlay with its stretched rubber bands is placed over the reversed card in the frame if the trainee's solutions are correct, the lines defined by the rubber bands register with the lines printed on the reverse of the card. If one or more bands do not register, then the trainee knows that all of his solutions are not correct.

The card and overlay may be removed from the frame in a variety of ways, a preferred manner being by insertion of the finger of the user through a hole 29 through the base plate. In order to insure that the overlay and the card are always placed in the frame in their correct relationship, one corner of the frame may be filled as indicated at 30 in Fig. 1 and the respective corresponding corner or corners 32, 34 of the card and overlay may be cut off so that both the overlay and the card can be placed in the frame in the same relative positions, it being understood that the solution lines on the back of the card are reversed from the correct solutions on the front so that when the card is turned over in the frame with the solution lines visible, they will correspond in the viewed position to the solutions and problems on the other sides of the card when these are in the viewed position. It will be apparent that when only one corner of the frame is filled, both of the adjacent corners of the card must be cut out in order that the card can be reversed to its proper position in the frame.

Figure 4:
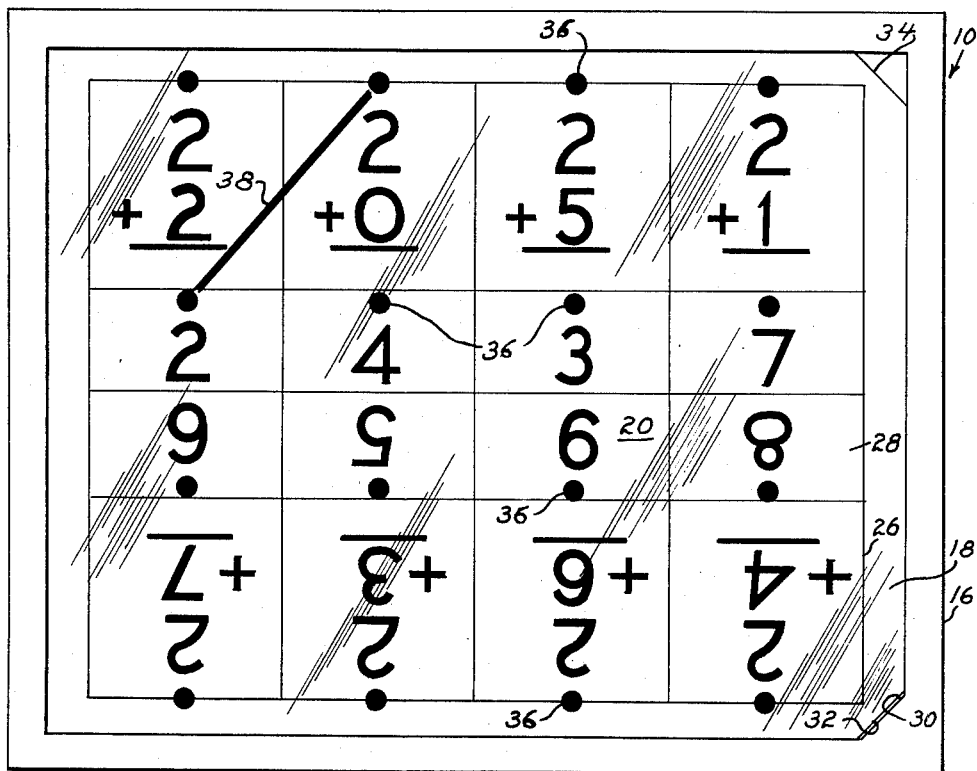
Fig. 4 is a vertical elevational view of a second embodiment of the present invention.

The embodiment of the invention illustrated in Fig. 4 is identical to the embodiment of the invention shown in Fig. 1 except that instead of a plurality of bosses and rubber bands, there are provided on the face of the overlay a series of dots or ground dimples 36 which correspond in position to the bosses of Fig. 1 or 2. In Fig. 4, the trainee would connect the problem dots and selected answer dots by means of lines, such as the line 38, drawn on the Plexiglas. There are provided on the market crayons in various colors known as "grease-pencils" which are specially designed to write or mark on glass-like surfaces, the marks being easily erased by a mere stroke of a cloth; it is contemplated in the use of the embodiment of Fig. 4 that the described "grease pencils" would be employed in making the lines.

The cards of the invention are illustrated with two rows of problem and answer blocks extending inwardly, towards each other in reversed position, with the rows of answer blocks being adjacent each other on opposite sides of the transverse center line of the frame. This arrangement is merely for convenience since it will be apparent that the problem and answer blocks could be arranged in any of a variety of fashions. It will also be apparent that in lieu of arithmetical problems, one set of blocks could contain a picture of an animal or object, and another set of blocks could contain the printed name of whatever is pictured. Other associations of words, numbers, pictures etc. can be visualized with the variety of cards and the arrangement of indicia thereon being almost limitless.

It will be apparent that any of a variety of aligning means for the cards and overlay may be employed though the described corner cut-out means of alignment is economical and efficient. It will also be apparent that the embodiments of the invention shown and described are exemplary only and may be modified within wide limits without departing from the scope and spirit of the appended claims.

In the claims the term "indicator means" refers to either the bosses of Fig. 1, the dimples or dots of Fig. 4 or any other suitable indicating indicia on the overlay which may register with problems and solutions on the cards and be connected in any suitable manner to match each problem with its correct solution. "Problems" and "solutions" in the appended claims are intended not only to include arithmetical problems but also the matching of a picture with its name, etc.

What is claimed is:

1. A training aid comprising a frame, card means in the frame bearing on one side thereof a series of problems and randomly placed solutions, a transparent overlay in said frame over said card, said overlay having thereon a plurality of indicator means arranged to overlie each problem and each answer on said card, said card bearing on the reverse thereof a plurality of lines, said lines being arranged that upon reversal of said card in said frame each line extends between an indicator means overlying a problem and an indicator means corresponding to the correct solution of said problem.

2. The training aid of claim 1 including aligning means in said frame and means on said overlay and said card cooperating with said aligning means.

3. The training aid of claim 1 wherein said indicating means comprise bosses.

4. The training aid of claim 3 including stretchable elements attached to the bosses overlying the problems on said cards and engageable with the bosses overlying said solutions on said cards.

5. The training aid of claim 1 wherein said indicating means comprise dots on said overlay.

References Cited in the file of this patent

UNITED STATES PATENTS

| | | |
|---|---|---|
| 1,253,908 | Thompson | Jan. 15, 1918 |
| 1,868,823 | Goodrich | July 26, 1932 |
| 2,725,644 | Wade et al. | Dec. 6, 1955 |

FOREIGN PATENTS

| | | |
|---|---|---|
| 494,479 | Belgium | July 1, 1950 |